(12) United States Patent
Pollard

(10) Patent No.: US 6,969,822 B2
(45) Date of Patent: Nov. 29, 2005

(54) LASER MICROMACHINING SYSTEMS

(75) Inventor: Jeffrey R. Pollard, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 103 days.

(21) Appl. No.: 10/437,377

(22) Filed: May 13, 2003

(65) Prior Publication Data

US 2004/0226926 A1 Nov. 18, 2004

(51) Int. Cl.$^7$ .............................................. B23K 26/14
(52) U.S. Cl. .............................. 219/121.84; 219/121.86
(58) Field of Search ....................... 219/121.84, 121.67, 219/121.7, 121.68, 121.86

(56) References Cited

U.S. PATENT DOCUMENTS

| | | |
|---|---|---|
| 2,841,477 A | 7/1958 | Hall |
| 3,364,087 A | 1/1968 | Raymond |
| 3,571,555 A | 3/1971 | Townes |
| 3,866,398 A | 2/1975 | Vernon, Jr. et al. |
| 4,027,137 A * | 5/1977 | Liedtke .................... 219/121.7 |
| 4,227,582 A * | 10/1980 | Price ........................... 175/16 |
| 4,260,649 A | 4/1981 | Dension et al. |
| 4,331,504 A | 5/1982 | Chuang et al. |
| 4,332,999 A | 6/1982 | Wittke |
| 4,467,168 A | 8/1984 | Morgan et al. |
| 4,532,401 A | 7/1985 | Shiozaki et al. |
| 4,643,799 A | 2/1987 | Tsujii et al. |
| 4,731,158 A | 3/1988 | Brannon |
| 4,801,352 A | 1/1989 | Piwczyk |
| 4,913,405 A | 4/1990 | Van Der Have et al. |
| 4,925,523 A | 5/1990 | Braren et al. |
| 5,164,324 A | 11/1992 | Russell et al. |
| 5,266,532 A | 11/1993 | Russell et al. |
| 5,322,988 A | 6/1994 | Russell et al. |
| 5,328,517 A | 7/1994 | Cates et al. |
| 5,345,057 A | 9/1994 | Muller |
| 5,348,609 A | 9/1994 | Russell et al. |
| 5,354,420 A | 10/1994 | Russell et al. |
| 5,362,450 A | 11/1994 | Russell et al. |
| 5,385,633 A | 1/1995 | Russell et al. |
| 5,387,314 A | 2/1995 | Baughman et al. |
| 5,443,033 A | 8/1995 | Nishizawa et al. |
| 5,451,378 A | 9/1995 | Russell et al. |
| 5,493,445 A | 2/1996 | Sexton et al. |
| 5,501,893 A | 3/1996 | Laermer et al. |
| 5,504,301 A | 4/1996 | Eveland |
| 5,531,857 A | 7/1996 | Engelsberg et al. |
| 5,591,285 A | 1/1997 | Afzali-Ardakani et al. |
| 5,608,436 A | 3/1997 | Baughman et al. |
| 5,643,472 A | 7/1997 | Engelsberg et al. |
| 5,669,979 A | 9/1997 | Elliott et al. |
| 5,688,715 A | 11/1997 | Sexton et al. |
| 5,716,495 A | 2/1998 | Butterbaugh et al. |
| 5,739,502 A * | 4/1998 | Anderson et al. ...... 219/121.71 |
| 5,760,368 A | 6/1998 | Nakata |

(Continued)

FOREIGN PATENT DOCUMENTS

| | | |
|---|---|---|
| GB | 2 342 883 | 4/2000 |
| WO | WO96/06694 | 3/1996 |
| WO | WO 01/10177 | 2/2001 |
| WO | WO 02/34455 | 5/2002 |
| WO | WO 02/47863 | 6/2002 |
| WO | WO 02/076666 | 10/2002 |

Primary Examiner—Geoffrey S. Evans

(57) ABSTRACT

The described embodiments relate to laser micromachining a substrate. One exemplary embodiment includes a chamber configured to receive an assist gas from an assist gas source. The chamber is configured to allow a laser beam to pass through the chamber to contact a substrate positioned outside of the chamber. The laser machine also includes a nozzle plate positioned in gas receiving relation with the chamber, the nozzle plate having at least one nozzle opening formed therein, wherein the at least one nozzle opening is substantially coincident a footprint of a feature desired to be formed in the substrate.

29 Claims, 6 Drawing Sheets

U.S. PATENT DOCUMENTS

| | | |
|---|---|---|
| 5,814,156 A | 9/1998 | Elliott et al. |
| 5,818,009 A | 10/1998 | Nakata et al. |
| 5,869,803 A | 2/1999 | Noguchi et al. |
| 5,874,011 A | 2/1999 | Ehrlich |
| 5,877,392 A | 3/1999 | Russell et al. |
| 5,898,522 A * | 4/1999 | Herpst .................. 359/511 |
| 5,912,186 A | 6/1999 | Yishino et al. |
| 5,935,464 A | 8/1999 | Dulaney et al. |
| 5,986,234 A | 11/1999 | Matthews et al. |
| 6,008,144 A | 12/1999 | Shih et al. |
| 6,074,957 A | 6/2000 | Donohoe et al. |
| 6,136,096 A | 10/2000 | Morishige |
| 6,144,010 A | 11/2000 | Tsunemi et al. |
| 6,204,475 B1 | 3/2001 | Nakata et al. |
| 6,284,148 B1 | 9/2001 | Laermer et al. |
| 6,331,258 B1 | 12/2001 | Silverbrook |
| 6,335,507 B1 * | 1/2002 | Nakata et al. ......... 219/121.67 |
| 6,339,205 B1 | 1/2002 | Nakayama |
| 6,376,797 B1 | 4/2002 | Piwczyk et al. |
| 6,384,371 B1 | 5/2002 | Hinei et al. |
| 6,400,389 B1 | 6/2002 | Shaffer et al. |
| 6,423,928 B1 | 7/2002 | Piwczyk |
| 6,448,534 B1 | 9/2002 | Kobsa |
| 6,472,295 B1 | 10/2002 | Morris et al. |
| 2002/0017514 A1 | 2/2002 | Lambert |
| 2002/0040894 A1 | 4/2002 | Borstel |
| 2002/0086544 A1 | 7/2002 | Boyle |
| 2002/0088780 A1 | 7/2002 | Boyle et al. |
| 2002/0108938 A1 | 8/2002 | Patel |
| 2002/0130116 A1 | 9/2002 | Lawson |
| 2002/0170891 A1 | 11/2002 | Boyle et al. |
| 2003/0062126 A1 | 4/2003 | Scaggs |

* cited by examiner

LASER MICROMACHINING SYSTEMS

BACKGROUND

The market for electronic devices continually demands increased performance at decreased costs. In order to meet these conditions, the components which comprise various electronic devices can be made more efficiently and/or to closer tolerances.

Laser micromachining is a common production method for controlled, selective removal of material. However, a desire exists for enhanced laser machining performance.

BRIEF DESCRIPTION OF THE DRAWINGS

The same components are used throughout the drawings to reference like features and components.

DETAILED DESCRIPTION OF THE PREFERRED EMBODIMENTS

Overview

The embodiments described below pertain to systems for laser micromachining a substrate. Such substrate can be incorporated into various microelectromechanical (MEMs) devices among other uses. Laser micromachining is a production method for controlled, selective removal of substrate material. By removing substrate material laser micromachining can form a feature into the substrate. Such features can be either through features, such as a slot or through via, which pass through the substrate's thickness, or blind features, such as a trench or blind via, which pass through only a portion of the substrate's thickness.

In one exemplary embodiment, the laser micromachining process utilizes a laser machine that can generate a laser beam for energizing and/or otherwise removing substrate material to form a feature in the substrate.

In some embodiments, an assist gas can be supplied to promote substrate removal. In some embodiments, the assist gas can be supplied via a chamber through which the laser beam passes. The chamber can include a nozzle plate which has a nozzle opening. The nozzle opening can define a pattern that represents a footprint of a feature to be formed within a substrate.

The various components described below may not be illustrated accurately as far as their size is concerned. Rather, the included figures are intended as diagrammatic representations to illustrate to the reader various inventive principles that are described herein.

Exemplary Embodiments

Figure 1:
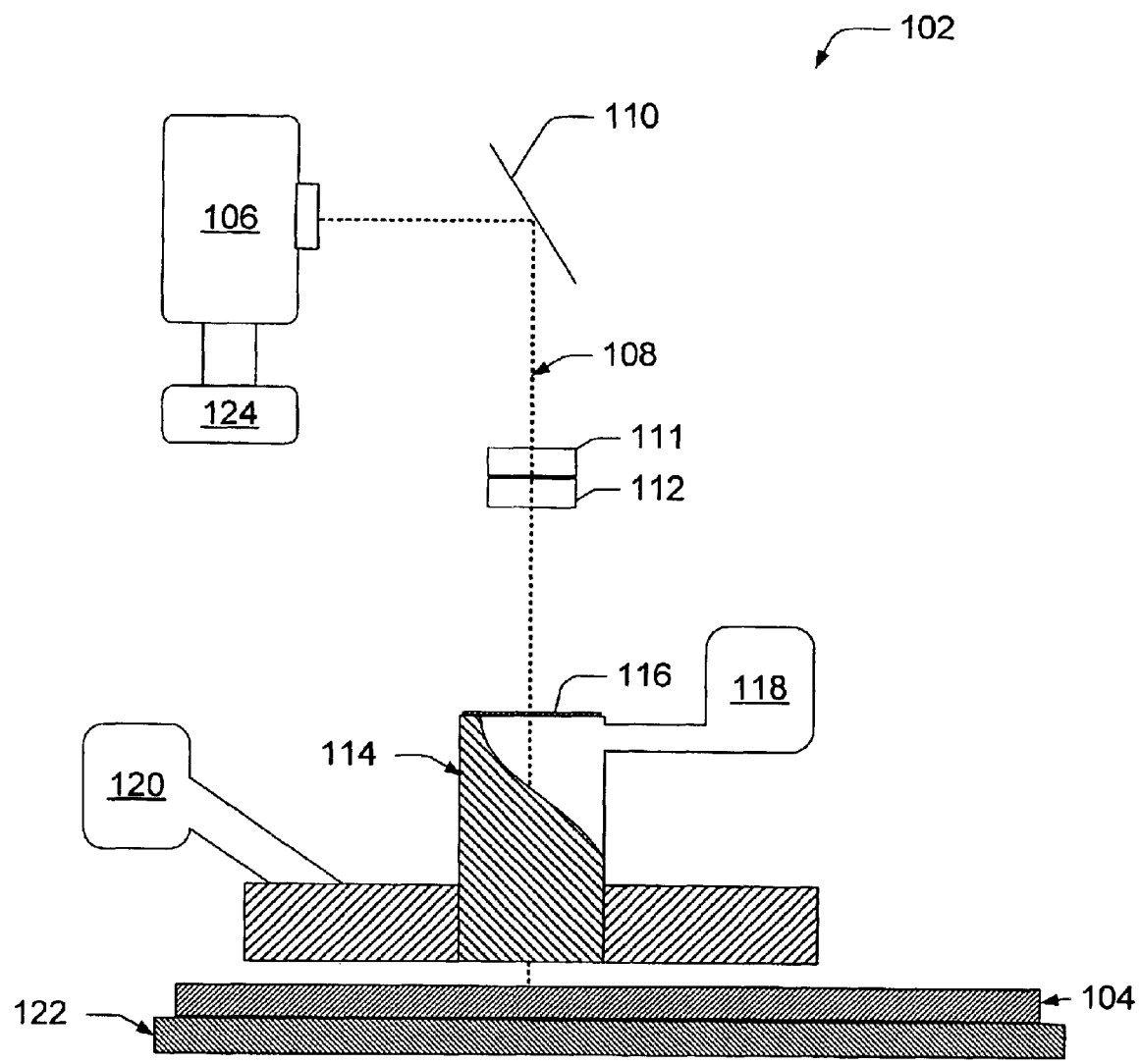
FIG. 1 shows a front elevational view of an exemplary laser machine in accordance with one embodiment.

FIG. 1 shows an exemplary apparatus or laser machine 102 capable of micromachining a substrate 104 in accordance with one exemplary embodiment. The laser machine can have a laser source 106 capable of emitting a laser beam 108. In this embodiment, laser machine 102 can further comprise a mirror 110, a galvanometer 111, a lens 112, and a chamber 114.

Figure 2:
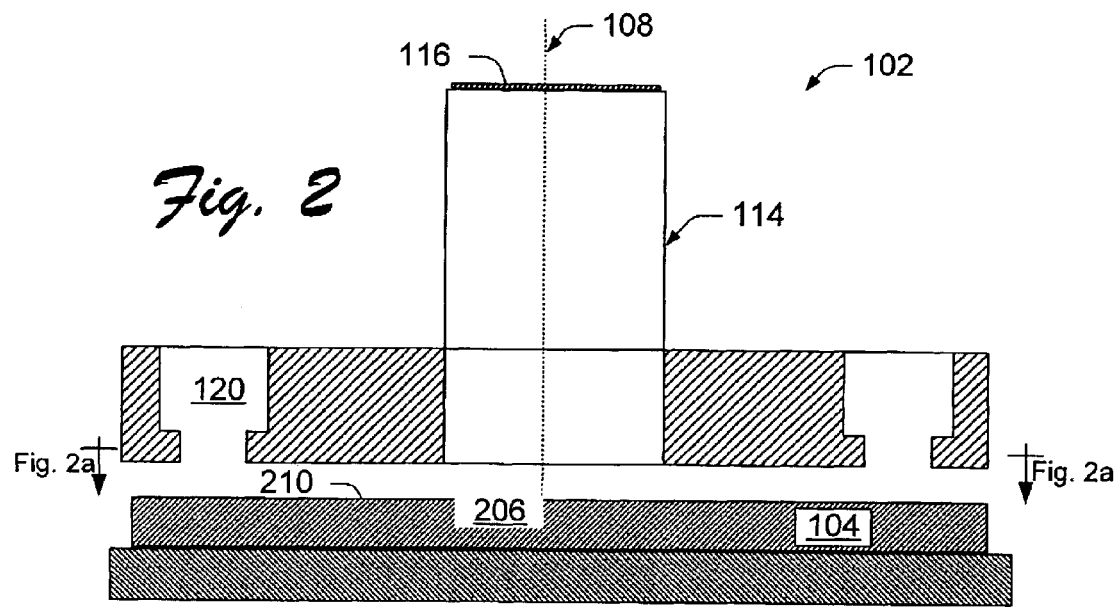
FIG. 2 shows a front elevational view of a portion of an exemplary laser machine in accordance with one embodiment.
Figure 2A:
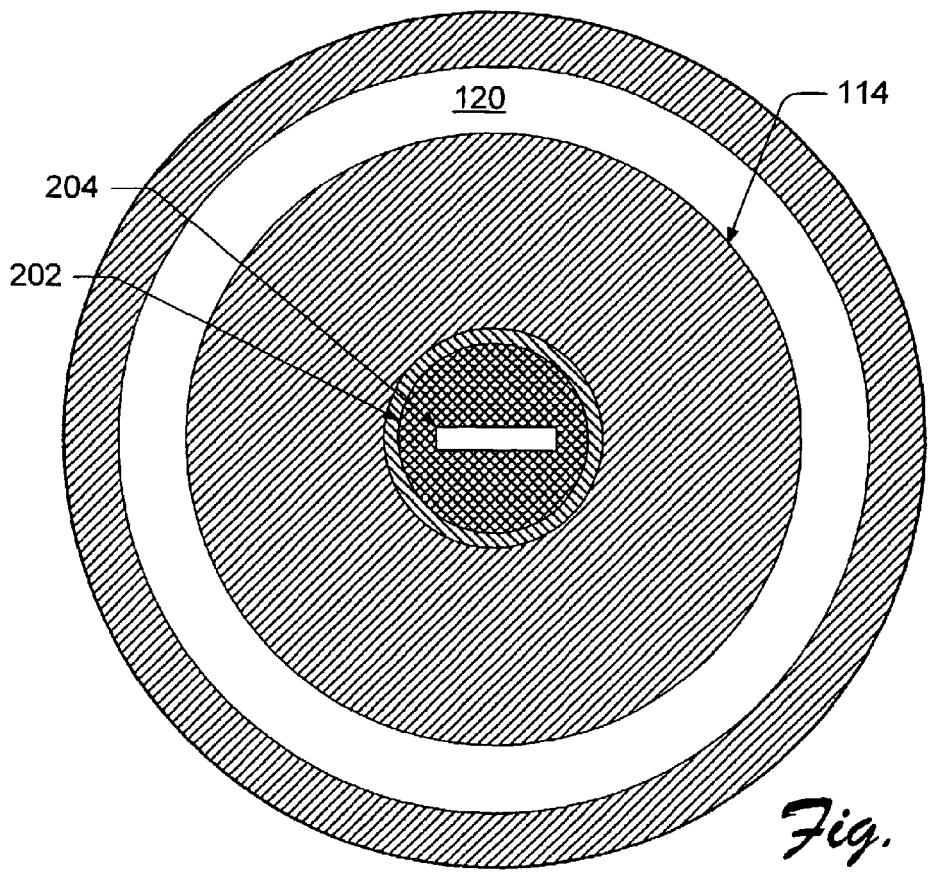
FIGS. 2a, 2b, and 2d show cross-sectional views of a portion of an exemplary laser machine in accordance with one embodiment.
Figure 2B:
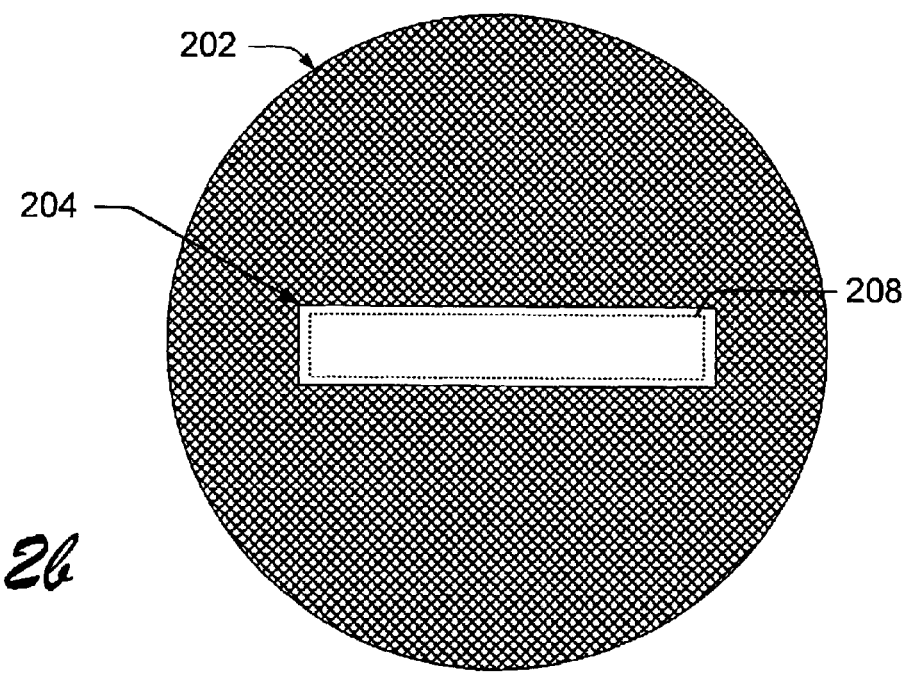

Chamber 114 can comprise a window 116 and a nozzle plate, shown in FIG. 2b. Chamber 114 can be supplied with assist gas via an assist gas source 118, and laser machining debris can be removed via extraction system 120.

Substrate 104 can be positioned on a fixture 122 for laser machining. Substrate 104 can include any suitable substrate. In this exemplary embodiment, silicon can be a suitable substrate. Examples of other suitable substrates include, among others, gallium arsenide, glass, silica, ceramics, or a semiconducting material. The substrate can comprise various configurations as will be recognized by one of skill in the art.

Controller 124 can control various laser machining conditions, examples of which will be described below. In this embodiment, controller 124 is shown coupled to laser source 106. It can alternatively or additionally be coupled to assist gas source 118 and fixture 122, among others.

In some embodiments, exemplary laser machine 102 can be constructed in part from commercially available laser machines. One such exemplary laser machine is the Xise 200 laser Machining Tool, manufactured by Xsil ltd. of Dublin, Ireland.

Exemplary laser machine 102 can utilize various laser sources 106. A laser source has a crystal or other structure when energized can emit the laser beam 108. An exemplary laser source is the Coherent AVIA 355-4500 which contains Crystalline Nd YVO4 (also known as Vanadate). Other exemplary crystals include among others, Nd:YAG and Nd:YLF.

In one embodiment, each of these materials can produce a laser beam 108 with a fundamental wavelength of about 1064 nanometers (nm). Laser beams of various wavelengths can provide satisfactory embodiments. For example, some embodiments can have a wavelength in the range of less than about 550 nm.

In some exemplary embodiments, the wavelength of the laser beam can be modified within the laser source. For example, one embodiment can utilize the Coherent AVIA 355, in which the frequency is tripled to yield a laser beam wavelength of 355 nm. Another exemplary embodiment can utilize a laser source with a wavelength of 532 nm. For example, the Lambda Physik PG532-15 can be utilized as a laser source that can provide a laser beam having such a wavelength. Other exemplary embodiments can utilize laser beams having wavelengths ranging from less than 100 nm to more than 1500 nm. Other satisfactory embodiments can be achieved with laser beams having various properties as will be discussed in more detail below.

Suitable laser beams, such as laser beam 108, can have any suitable power density in the described embodiments. In some exemplary embodiments, the laser conditions can establish a laser beam with a peak power density of greater than 1 $GW/cm^2$, with one exemplary embodiment having a peak power density of about 42.5 $GW/cm^2$. Exemplary laser machines, such as laser machine 102, can in various embodiments generate the laser beam in pulses in any suitable range of values. In some embodiments, pulse values range from about 1 kilohertz (kHz) to about 200 kHz. In one embodiment the pulse rate is about 20 kHz. Other satisfactory embodiments can use rates below and above the range given here. The laser beam pulse width can be about 1 to 100 nanoseconds, with one exemplary embodiment using about 20 nanoseconds.

The movement of the laser beam 108 relative to substrate 104 per unit of time is referred to in this document as the laser scan rate. Exemplary embodiments can utilize a laser scan rate of about 1 to about 1000 millimeters/second (mm/sec). Some exemplary embodiments can utilize a laser scan rate of about 10 to about 300 mm/sec with other exemplary embodiments utilizing about 100 mm/sec.

Exemplary laser beams can provide sufficient energy to energize substrate material at which the laser beam is directed. Energizing can comprise melting, vaporizing, exfoliating, phase exploding, and/or ablating among other processes. Some exemplary embodiments can energize substrate material equal to or above its material removal threshold. The material removal threshold is the energy density level used to remove substrate material by melting, vaporizing, exfoliating, phase exploding, reacting, and/or any combination thereof.

One or more lenses 112 can be utilized in some embodiments to focus or expand the laser beam 108. In some of these exemplary embodiments, laser beam 108 can be focused in order to increase its energy density to more effectively machine the substrate. In some of these exemplary embodiments, the laser beam can be focused with one or more lenses 112 to achieve a desired diameter where the laser beam 108 contacts the substrate 104. In some of these embodiments, this diameter can range from about 5 micron to more than 100 microns. In one embodiment, the diameter is about 30 microns. Laser beam 108 can be pointed directly from the laser source 106 to the substrate 104, or indirectly through the use of one or more mirror(s) 110, and/or galvanometers 111.

Some exemplary embodiments can also utilize extraction system 120 to remove vaporized substrate materials and/or molecules formed from substrate material and a component of the assist gas, as well as various other molecules. In some embodiments, the debris extraction system can comprise a vacuum system and filtration system positioned to evacuate material in proximity to the laser beam 108 and substrate 104. In some embodiments, chamber 114 can be pressurized above ambient atmospheric pressure while extraction system 120 is maintained at less than ambient atmospheric pressure. Such a configuration can supply assist gas during laser machining and remove various byproducts as will be recognized by the skilled artisan.

Figure 2C:
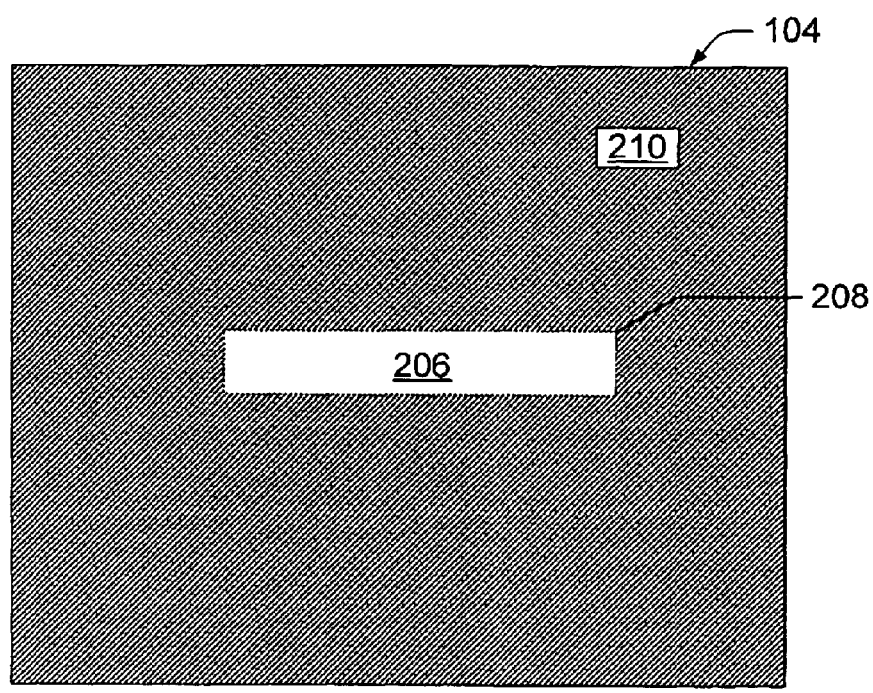
FIGS. 2c and 2e show exemplary laser machined substrates in accordance with one exemplary embodiment.
Figure 2D:
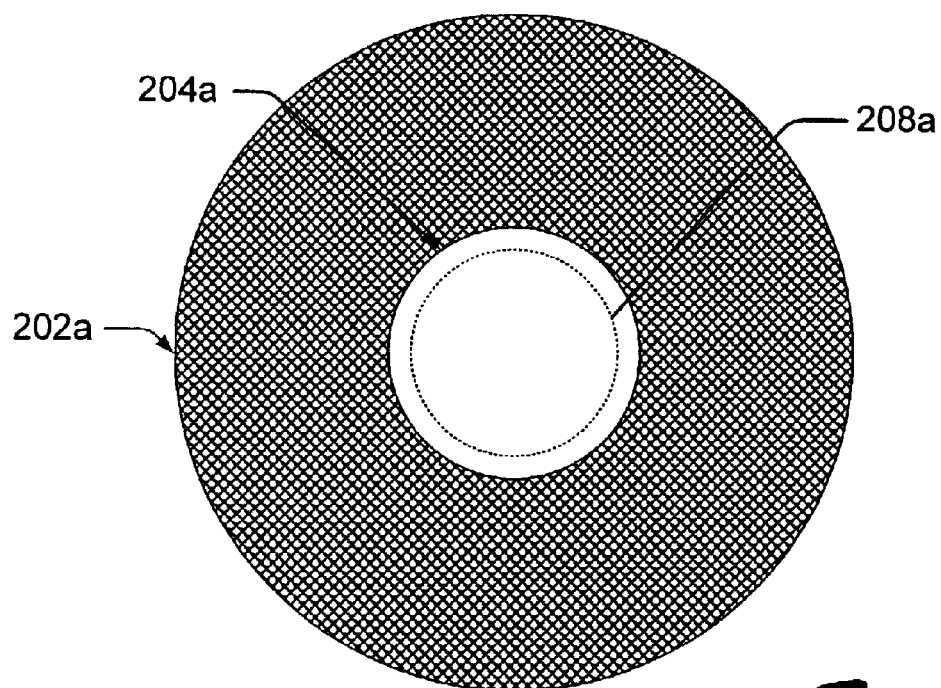
Figure 2E:
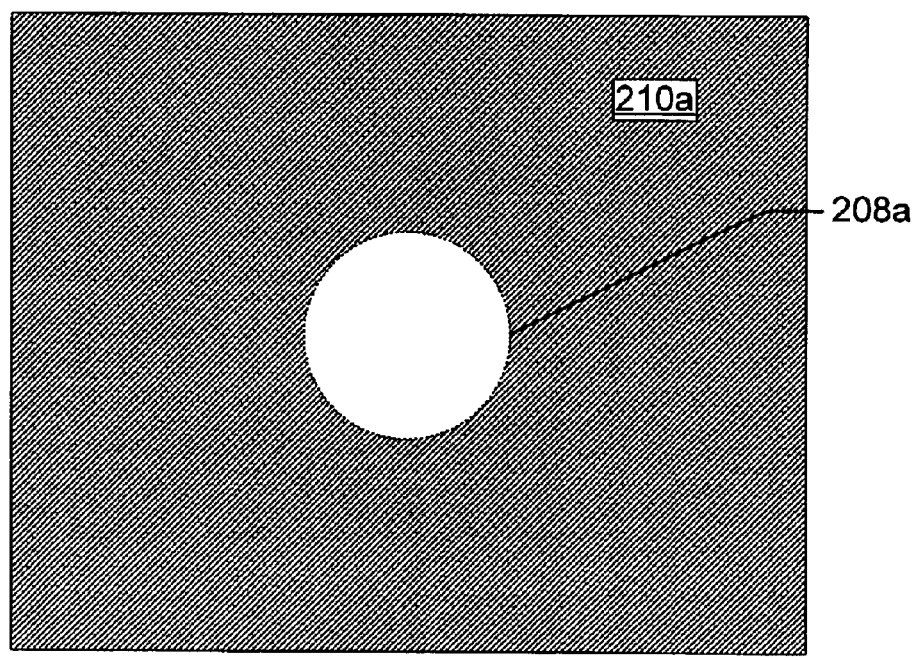

FIGS. 2, 2*a*, 2*b*, and 2*d* show a portion of laser machine 102 in more detail, while FIGS. 2*c* and 2*e* show exemplary laser machined substrates. FIG. 2 shows a cross-sectional view of chamber 114 taken along a plane containing laser beam 108. FIG. 2*a* shows a cross-sectional view as indicated in FIG. 2 which is transverse to laser beam 108. Referring to the embodiment shown in FIGS. 2–2*a*, nozzle plate 202 can be positioned against chamber 114 to provide a gas seal therebetween to allow assist gas supplied to the chamber to exit through a nozzle opening 204.

In some embodiments, nozzle plate 202 can be an integral part of chamber 114, while in other embodiments the nozzle plate is a separate component. In some of these embodiments, nozzle plates can be interchangeable as discussed below. Chamber 114 and nozzle plate 202 can be constructed of any suitable material or materials. For example, chamber 114 and nozzle plate 202 can be formed from anodized aluminum among other materials.

In some embodiments, chamber 114 can supply assist gas to a portion of the substrate to increase the speed and/or efficiency at which the laser beam cuts or removes substrate material and related byproducts.

Assist gas can be supplied at various delivery pressures and velocities. For example, some embodiments can utilize higher flow rates as feature depth increases. In some of these embodiments, the flow rate can be increased in a linear relationship to feature depth. Other suitable embodiments can use other relationships. Exemplary embodiments can utilize various assist gases. In some embodiments, the assist gas can comprise a halide or a halogen containing gas. Exemplary assist gases can comprise, but are not limited to halocarbons and sulfur hexafluoride. 1,1,1,2 tetrafluoroethane can comprise one such exemplary assist gas.

In some embodiments, the assist gas can be supplied at a flow rate sufficient to be an excess reagent in an interface region where the laser beam removes substrate material to form the feature. In one exemplary embodiment, where the assist gas comprises 1,1,1,2 tetrafluoroethane, the gas assist nozzle delivers the assist gas at a flow rate in a range of about 0.5 standard cubic feet per hour to about 20 standard cubic feet per hour. A further embodiment supplies about 5 standard cubic feet per hour of 1,1,1,2 tetrafluoroethane.

In some embodiments, the assist gas may comprise a single compound. Other embodiments, may supply an assist gas comprising a combination of gases, such as air, nitrogen and/or water. In one such example, an assist gas, such as a halocarbon, may be delivered with other assist gases such as nitrogen or ambient air.

In some embodiments utilizing assist gases comprised of multiple compounds, a reactive assist gas or one that is otherwise consumed by the laser machining process may be supplied at a desired level. The desired level in one example can be a level which maintains the reactive gas as an excess reagent. This compound may be supplied in combination with other assist gas compounds which are not consumed significantly in the laser machining process.

In some embodiments, nozzle opening 204 can define a pattern that represents a footprint of a feature 206 within substrate 104. One such example can be more clearly evidenced in FIGS. 2*b*–2*c*. FIG. 2*b* shows nozzle plate 202 in more detail, and FIG. 2*c* shows a top view of substrate 104. In this embodiment, nozzle opening 204 defines a pattern 208 of a footprint of feature 206 in the substrate's first surface 210. In this particular embodiment, the nozzle opening approximates a rectangle. Examples of other suitable nozzle openings will be described below.

In this embodiment, nozzle opening 204 also is substantially coincident the feature's pattern 208 at the substrate's first surface 210. In this particular embodiment, nozzle opening 204 also circumscribes pattern 208. The skilled artisan will recognize that such a configuration in combination with a suitable window 116 can allow laser beam 108*b* to be scanned over the feature's footprint without moving chamber 114 and/or nozzle plate 202 relative to substrate 104.

FIGS. 2*d*–2*e* show another example of a nozzle opening defining a feature's footprint pattern. In this example, nozzle plate 202 has been replaced with nozzle plate 202*a*. Nozzle opening 204*a* is generally circular and can define a circular feature's footprint 208*a* at the substrate's first surface 210*a*. Other suitable nozzle plate configurations will be recognized by the skilled artisan.

In the embodiment shown in FIG. 2*d*, nozzle opening 204*a* comprises less than 50 percent of the surface area of nozzle plate 202*a* that generally lies in the plane of the page. Other suitable nozzle openings can comprise a higher or lower percentage of the nozzle plate area. Further, nozzle plate 202 shown in FIG. 2, and nozzle plate 202a shown in FIG. 2d provide but two examples of exemplary nozzle opening shapes. The skilled artisan should recognize that in some embodiments, a particular nozzle plate configuration can be installed on the chamber for a desired feature shape.

Figure 3A:
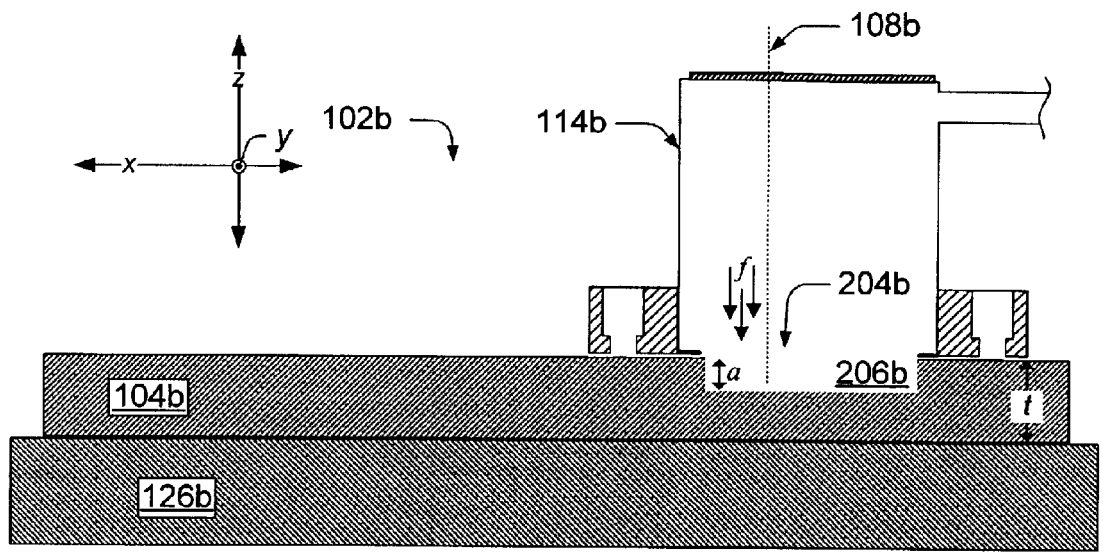
FIGS. 3a–3c show cross-sectional views of a portion of an exemplary laser machine in accordance with one embodiment.
Figure 3B:
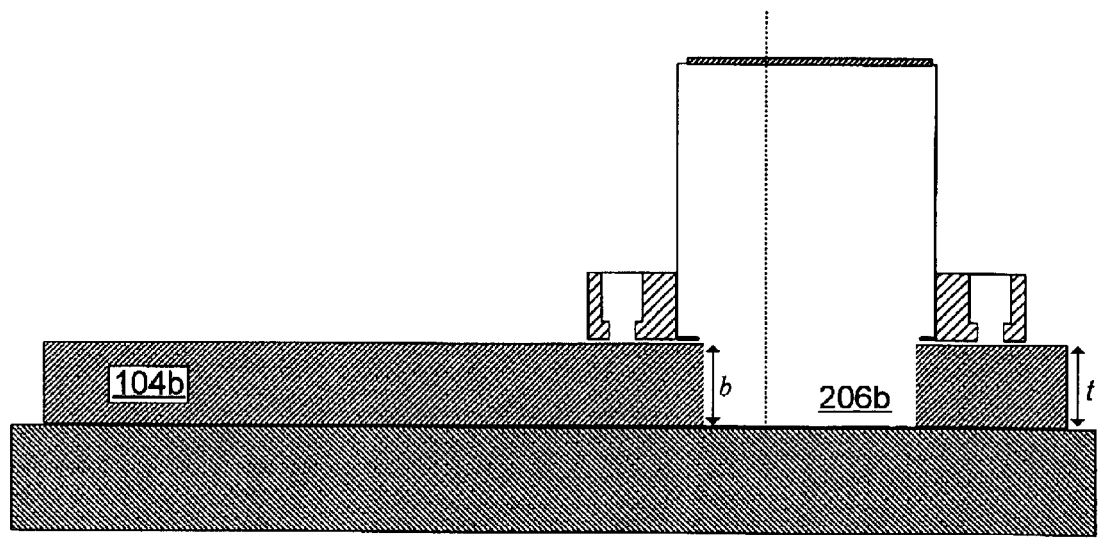
Figure 3C:
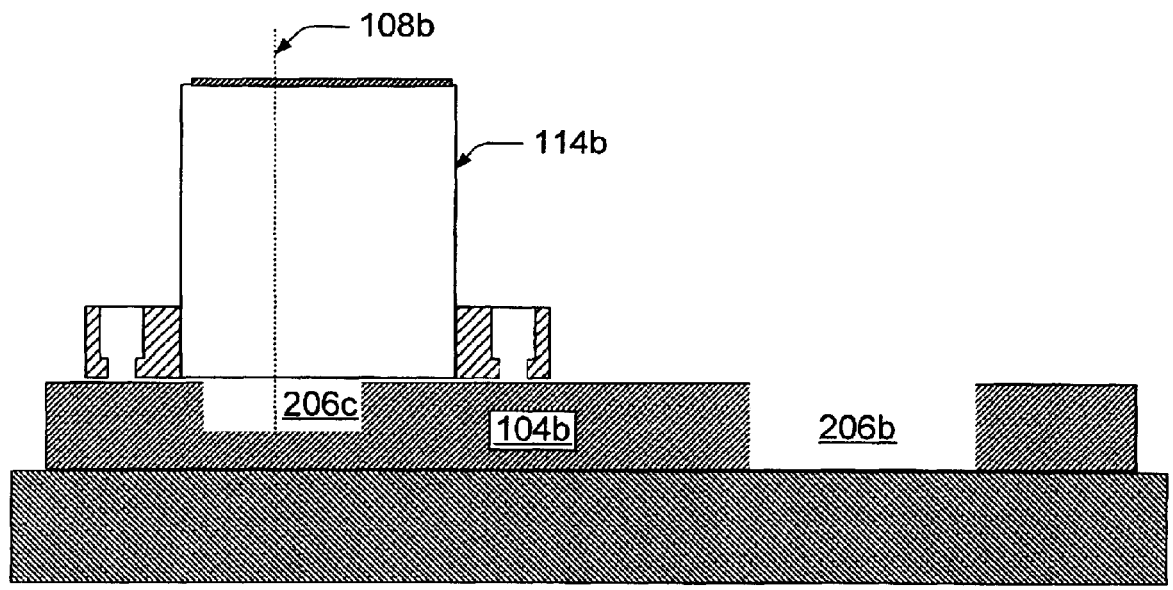

FIGS. 3a–3c show another exemplary laser machine 102b. In this embodiment, substrate 104b can be positioned proximate to, but outside of the chamber 114b. Such a configuration can allow chamber 114b to supply assist gas to substrate 104b to increase laser machining efficiency during feature formation. In this embodiment, assist gas can flow through nozzle opening 204b generally coaxially to laser beam 108b. An example of such coaxial assist gas flow is indicated in FIG. 3a by arrows labeled "f".

As shown in FIG. 3a, substrate 104b, which in this embodiment comprises a silicon wafer, is positioned on fixture 126b. Any suitable positioning means can be utilized to hold the substrate relative to the fixture. Examples include, but are not limited to, physical clamps and vacuum pressure. In some embodiments, fixture 126b can be configured to move the substrate along the x, y and/or z coordinates as desired.

In some of these embodiments, laser machine 102b can be configured to allow chamber 114b to move with the fixture 126b to maintain the fixture relative to a portion of the substrate 104b. In some of these embodiments, fixture 126b, chamber 114b and substrate 104b can be moved as a unit relative to laser beam 108b to form feature 206b. Alternatively or additionally, laser beam 108b can be moved or scanned relative to fixture 126b, chamber 114b and substrate 104b to form feature 206b.

FIG. 3a shows a feature 206b formed part way through the substrate to a feature depth a. In this instance, feature depth a is less than the substrate's thickness t so the feature can be termed a blind feature.

FIG. 3b shows feature 206b formed to a second feature depth b. In this instance feature depth b equals the thickness t of the substrate and so the feature becomes a through feature. In this embodiment, feature 206b can be formed without moving chamber 114b and/or substrate 104b relative to one another.

FIG. 3c shows the chamber repositioned relative to substrate 104b. Laser beam 108b forms another feature 206c into substrate 104b.

Figure 3D:
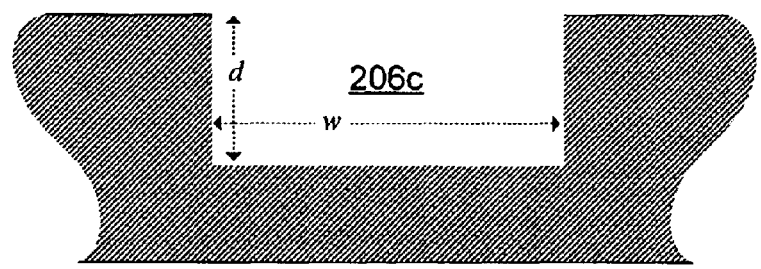
FIG. 3d shows an exemplary laser machined substrate in accordance with one exemplary embodiment.

FIG. 3d shows feature 206c in more detail. In some embodiments, feature 206c can have a generally uniform depth d defining the bottom surface of the feature. Alternatively or additionally, in some embodiments, feature 206c can have a generally uniform width w throughout its depth.

As mentioned above various suitable laser machining conditions can be utilized in forming a feature. In some embodiments, the laser machining conditions can be changed as a feature is formed into the substrate. Examples of laser machining conditions can comprise one or more of assist gas composition, assist gas flow, assist gas temperature, laser beam scan rate, laser beam frequency, laser beam power, and laser beam wavelength, among others.

Still other embodiments may deliver assist gases at a first flow rate during a portion of the laser machining process, and then provide a second different flow rate for another portion of the laser machining process. In one such example, assist gas can be supplied at a first flow rate as substrate is removed to a first feature depth and then the assist gas can be delivered at a second higher rate. In one such example, a feature can be formed utilizing water as an assist gas, either alone, or in combination with other assist gases. Upon reaching a predetermined parameter or condition, such as a given feature depth, the flow of assist gas can be increased.

Alternatively or additionally, in some further embodiments, the composition of the assist gas can be changed as feature depth increases. In still other embodiments, the flow rate and composition of the assist gas may remain unchanged after the predetermined condition is met while another laser machining condition such as assist gas composition, assist gas temperature, laser beam scan rate, laser beam frequency, laser beam power, laser beam wavelength, assist gas pressure and/or substrate temperature, among others, is changed.

Conclusion

The described embodiments can utilize a laser machine configured to form a feature into a substrate. In several embodiments, the laser beam can remove substrate material when directed through a chamber configured to supply assist gas via a nozzle plate. The substrate can be positioned proximate to, but outside of the chamber for laser machining. The nozzle plate can have a nozzle opening which, in some embodiments, allows a feature to be formed without moving the chamber and substrate relative to one another.

Although the invention has been described in language specific to structural features, it is to be understood that the inventive aspects defined in the appended claims are not necessarily limited to the specific features described. Rather, the specific features are disclosed as illustrative examples.

What is claimed is:

1. A laser micro-machining apparatus comprising:
   a chamber configured to receive an assist gas, the chamber comprising a window through which a laser beam can be directed;
   a nozzle plate positioned against the chamber having a nozzle opening that defines a pattern that represents a footprint of a feature to be formed in a substrate; and,
   a gas supply connected to the chamber for supplying an assist gas into the chamber and through the nozzle opening.

2. The apparatus of claim 1, wherein the chamber and the nozzle plate remain stationary relative to the substrate during formation of the feature.

3. The apparatus of claim 1, further comprising a fixture to position the substrate relative to the nozzle plate and external to the chamber and upon which the substrate can be contacted by the laser beam and wherein the fixture can move the substrate in relation to the laser beam.

4. The apparatus of claim 1, further comprising a mechanism for moving the laser beam relative to the substrate.

5. The apparatus of claim 1, wherein the pattern of the nozzle plate approximates a rectangle.

6. The apparatus of claim 1, wherein the pattern of the nozzle plate approximates a circle.

7. The apparatus of claim 1 further comprising a controller for controlling conditions for supplying the assist gas from the gas source to the chamber, wherein the conditions comprise one or more of temperature of the assist gas, composition of the assist gas, and flow rate of the assist gas.

8. The apparatus of claim 1, wherein the nozzle plate is configured to allow assist gas to flow toward the substrate generally coaxially to the laser beam.

9. The apparatus of claim 1, wherein the nozzle opening and the window are configured to allow the feature to be formed without moving the chamber relative to the substrate.

10. The apparatus of claim 1, wherein the substrate comprises a wafer.

11. The apparatus of claim 1, wherein the window comprises a quartz crystal.

12. A micromachining apparatus comprising:
a chamber configured to receive an assist gas from an assist gas source and configured to allow a laser beam to pass through the chamber to contact a substrate positioned outside of the chamber; and,
a nozzle plate positioned in gas receiving relation with the chamber, the nozzle plate having at least one nozzle opening formed therein, wherein the at least one nozzle opening is substantially coincident a footprint of a feature desired to be formed in the substrate.

13. The apparatus of claim 12, wherein the nozzle opening generally circumscribes the footprint.

14. The apparatus of claim 12, wherein the chamber is configured to remain stationary relative to the substrate when the feature is formed in the substrate.

15. The apparatus of claim 12, wherein the nozzle opening allows assist gas to flow through the nozzle opening toward the substrate generally coaxially to the laser beam.

16. The apparatus of claim 12 further comprising an evacuation system.

17. The apparatus of claim 16, wherein the evacuation system is positioned generally opposite the laser beam relative to the nozzle opening.

18. A micromachining apparatus comprising:
a laser source configured to generate a laser beam to remove substrate material through a first surface of a substrate to form a feature in the substrate; and,
a chamber comprising a window and a nozzle plate that has an opening, wherein the chamber is configured to allow the laser beam to enter the chamber via the window and exit the chamber via the opening wherein the opening defines a pattern of the feature at the first surface of the substrate and an assist gas can exit the chamber via the opening to promote substrate removal.

19. The apparatus of claim 18, wherein the chamber is configured to remain stationary relative to the substrate when the feature is formed in the substrate.

20. The apparatus of claim 18, wherein the nozzle plate is an integral portion of the chamber.

21. The apparatus of claim 18, wherein the nozzle plate is a distinct removable component of the chamber.

22. The apparatus of claim 18, wherein the opening of the nozzle plate comprises less than about 50 percent of the surface area of the nozzle plate.

23. The apparatus of claim 18 further comprising an evacuation system configured to supply a vacuum to a region surrounding and generally coplanar with the opening.

24. An apparatus comprising:
a nozzle plate that has an opening, wherein the nozzle plate is configured to be positioned in gas receiving relation to a chamber that is configured to allow a laser beam to exit the chamber via the opening, wherein the opening defines a pattern of a feature to be formed in a substrate, and wherein the opening comprises less than 50 percent of the surface area of the nozzle plate.

25. The apparatus of claim 24, wherein the opening approximates a rectangle.

26. An apparatus comprising:
a chamber configured to receive a nozzle plate that has an opening, wherein the chamber is configured to allow a laser to enter the chamber via a window and exit the chamber via the opening, and the opening being configured to allow the laser passing through the window to trace an elongate pattern within the opening without striking the nozzle plate, wherein the chamber is further configured to receive an assist gas that can exit the chamber via the opening.

27. The apparatus of claim 26, wherein the opening of the nozzle plate is rectangular.

28. An apparatus comprising:
means for removing substrate material from a substrate to form a desired feature through a first surface of the substrate; and,
means for supplying an assist gas to essentially all portions of the first surface through which the feature is to be formed, without placing the substrate in a chamber, and without moving said means for supplying during formation of the desired feature, and while further allowing the removing means to trace a pattern of the desired feature on the first surface.

29. The apparatus of claim 28, wherein the pattern of the desired feature defines an elongate footprint on the first surface.

* * * * *